Aug. 10, 1943.　　　　J. BREEDIS　　　　2,326,326
METHOD OF POLYMERIZATION
Filed Jan. 16, 1940
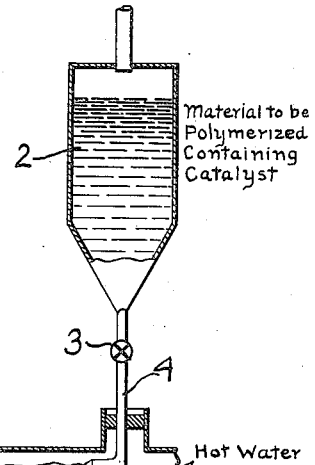
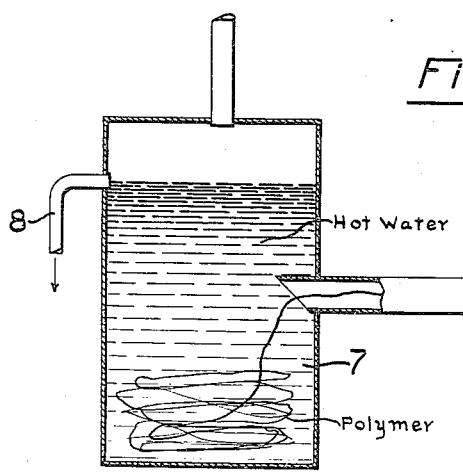
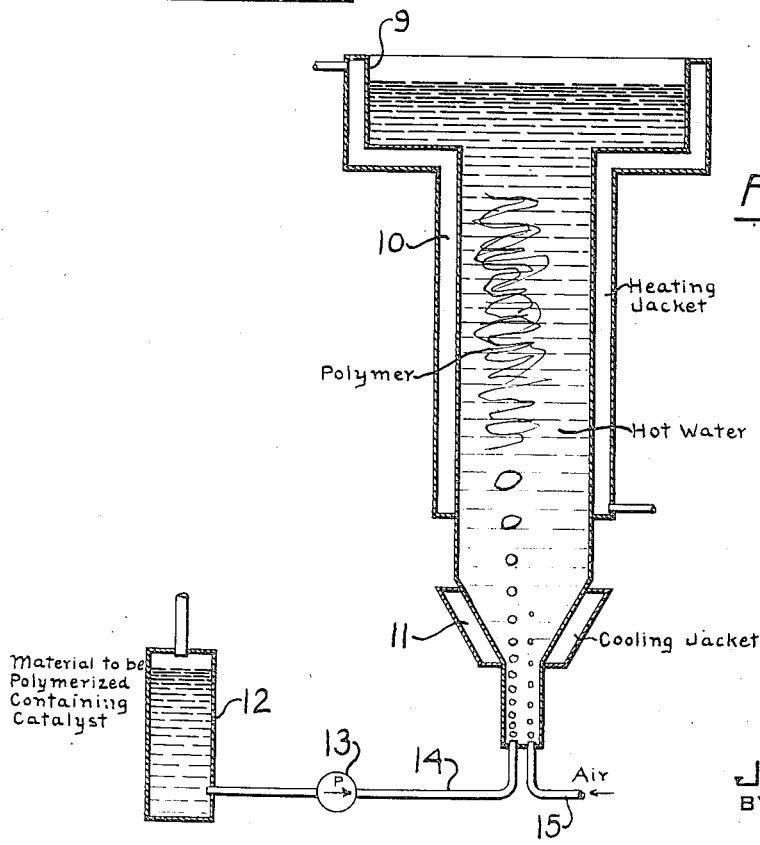
INVENTOR
John Breedis
BY John F. Bergin
ATTORNEY Patented Aug. 10, 1943

2,326,326

UNITED STATES PATENT OFFICE 2,326,326

METHOD OF POLYMERIZATION

John Breedis, Croydon, Pa., assignor to Röhm & Haas Company, Philadelphia, Pa.

Application January 16, 1940, Serial No. 314,044

4 Claims. (Cl. 260—83)

This invention relates to a method for the rapid polymerization of methyl methacrylate and similar substances. It relates more particularly to the polymerization of those substances of this class which form hard polymers suitable for the manufacture of molding compositions.

It has been found that methyl methacrylate, ethyl methacrylate, mixtures of these with each other and with other polymerizable substances such as the amides, nitriles, and esters of acrylic and methacrylic acids, vinyl acetate, styrene etc. can be polymerized very rapidly when a fine stream of the polymerizable composition is injected into water at 90–125° C. By thus injecting the fine stream of polymerizable material into the hot water it is heated almost instantaneously to polymerizing temperatures and polymerization under these circumstances takes place very rapidly.

The process may be carried out in any suitable apparatus, two types of which are illustrated in the accompanying drawing.

Fig. 1 illustrates an apparatus in which the material to be polymerized is injected in a fine stream into a flowing body of water heated to the desired temperature.

Fig. 2 illustrates an apparatus in which the material to be polymerized is injected into a substantially stationary body of hot water.

The apparatus shown in Fig. 1 consists of a container 2 for the material to be polymerized, a valve 3 for controlling the flow of this material, a tube 4 inserted in a second tube 5 and having a small opening 6, a receiver 7 into which the tube 5 is inserted and an overflow pipe 8. This apparatus operates as follows:

The liquid to be polymerized containing a suitable catalyst such as benzoyl peroxide is placed in the container 2 and a stream of hot water from any convenient source is passed through the tube 5. The liquid to be polymerized is then allowed to flow into the stream where it is instantaneously heated to the temperature of the water and is polymerized within a few seconds. The water then carries the polymer to the receiver 7 where it settles to the bottom as it is heavier than water and the water passes out through the overflow 8. The product is obtained in the form of threads or shreds and may be separated from the water, rinsed and dried in any convenient manner. It may be used directly for molding purposes or compacted as on a rubber mill and ground to any desired degree of fineness for use as a molding powder.

Instead of using water from an independent source, that coming from the overflow may be circulated through a suitable pump and heater and returned to the inlet end of the tube 5.

The velocity with which the water is passed through the tube 5 will be determined by the speed at which the polymerization of the liquid takes place. It is fixed so that, by the time the shreds of polymer reach the end of this tube, they will be completely polymerized. Of course, the length of the tube can be varied as well as the velocity of the water to suit the speed of polymerization.

The size of the opening 6 in the inlet tube for the monomer should be fairly small, say 0.5 mm. or less, so that the emerging stream of liquid is heated throughout almost instantaneously. The diameter of the tube 5 should be so chosen that the maximal velocity of the water required for any given polymerizable liquid or length of tube will be below that of turbulent flow as this might cause the shreds to be thrown against the walls of the tube before they are completely polymerized in which case they would stick to the tube and ultimately clog it. Even under conditions of turbulent flow it is possible to practically eliminate the tendency of the material to stick to the walls of the tube by adding a small amount of a suitable wetting agent to the water.

The process may be carried out at atmospheric pressure or, if temperatures higher than 100° C. are desired, the apparatus may be suitably closed and controlled by release valves. In such cases means for applying sufficient pressure to the liquid in the container 2 would be provided.

If desired, the polymerizable liquid may be partially polymerized, for example to a thick syrup, before injecting it into the stream of hot water. In this manner by adjusting the velocity of the water and that of the polymerizable liquid emerging from the opening 6, it is possible to prepare continuous threads of the polymer. The diameter of these threads is determined by the size of the opening 6.

The apparatus shown in Fig. 2 consists of vessel 9 surrounded by a heating jacket 10. The lower part of the vessel 9 is surrounded by a cooling jacket 11. A container 12 for the material to be polymerized and a pump 13 for injecting the material through pipe 14 into the water contained in the vessel 9 are provided. A pipe for injecting air is also arranged at the lower end of the vessel.

This apparatus operates as follows:

The material to be polymerized is pumped from the container to the bottom of the vessel 9 which is filled with hot water, the upper part being at a temperature of about 95° C. As the drops of monomer or partially polymerized material rise through the water, they are rapidly heated and expand at such a rate that they break. At the same time they polymerize very rapidly and by the time they reach the top of the vessel they are in the form of a spongy mass which can be removed from the vessel by any convenient means. By bubbling a stream of air through the water the removal of the polymer is facilitated. This apparatus may also be operated at temperatures above 100° C. by closing the top of the vessel and working under pressure.

The invention may be illustrated by the following examples but it is not limited to the exact temperatures, velocities, and other conditions shown as it may be otherwise practiced within the scope of the appended claims.

Example 1

Monomeric methyl methacrylate containing 0.8% of benzoyl peroxide as a catalyst was injected into a stream of water at 95–98° C. which was flowing through a tube at the rate of about one foot per second. Polymerization was practically complete after approximately a three-foot flow. The polymer was obtained in the form of fine shreds.

Example 2

A mixture of 75% methyl methacrylate and 25% ethyl acrylate containing 0.8% of benzoyl peroxide was pre-polymerized to an extent of about 35%. This syrup was then injected into a stream of water at 95–98° C. which was flowing at a velocity of one foot per second. Polymerization was practically complete after a two-foot flow. The polymer was obtained in the form of threads.

Example 3

A mixture of 75% methyl methacrylate and 25% ethyl acrylate was polymerized to about the consistency of glycerine. This syrup was pumped into the bottom of a vessel such as is shown in Fig. 2. The temperature at the bottom of the vessel was held somewhat below 80° C. and the water in the upper part at about 95° C. The vessel was 20 inches long and by the time the material had reached the surface of the water it was completely polymerized.

I claim:

1. The process for preparing a methacrylic resin in a form suitable for use in molding compositions which comprises injecting directly into water, maintained at a temperature between about 90° C. and about 125° C., a water-insoluble, polymerizable liquid selected from the group consisting of methyl methacrylate, ethyl methacrylate, mixtures thereof, and at least one of them with at least one member of the group consisting of esters of acrylic acid, nitriles of acrylic acid and methacrylic acid, vinyl acetate and styrene, through an orifice whose greatest cross-sectional dimension is at most 0.5 mm., thereby to cause said water-insoluble liquid to form as particles of such small cross-section that they are heated to the temperature of the water and thus polymerized in a few seconds after injection, removing said polymerized material, and drying same.

2. The process of claim 1 in which the polymerizable liquid consists essentially of methyl methacrylate.

3. The process of claim 1 in which the polymerizable liquid is partially pre-polymerized before being injected into the water.

4. The process of claim 1 in which the polymerizable liquid is a mixture of methyl methacrylate and ethyl acrylate.

JOHN BREEDIS.